United States Patent
Yu et al.

(10) Patent No.: US 9,282,523 B2
(45) Date of Patent: Mar. 8, 2016

(54) MAXIMUM OUTPUT POWER CONFIGURATION WITH UE PREFERENCE IN CARRIER AGGREGATION

(71) Applicant: MEDIATEK INC., Hsinchu (TW)

(72) Inventors: Chia-Hao Yu, Yilan County (TW); Ju-Ya Chen, Kaohsiung (TW); Yih-Shen Chen, Hsinchu (TW); Yen-Po Lee, Hsinchu (TW); Yi-Chun Wei, Hsinchu (TW); Tsang-Yi Shen, Hsinchu (TW)

(73) Assignee: MEDIATEK INC. (TW)

( * ) Notice: Subject to any disclaimer, the term of this patent is extended or adjusted under 35 U.S.C. 154(b) by 27 days.

(21) Appl. No.: 14/261,747

(22) Filed: Apr. 25, 2014

(65) Prior Publication Data
US 2014/0321304 A1    Oct. 30, 2014

Related U.S. Application Data

(60) Provisional application No. 61/816,264, filed on Apr. 26, 2013.

(51) Int. Cl.
*H04W 52/24* (2009.01)
*H04W 52/36* (2009.01)
*H04W 72/02* (2009.01)
(Continued)

(52) U.S. Cl.
CPC ............... *H04W 52/365* (2013.01); *H04L 5/00* (2013.01); *H04L 5/001* (2013.01); *H04W 52/367* (2013.01); *H04W 72/02* (2013.01); *H04B 17/336* (2015.01);
(Continued)

(58) Field of Classification Search
None
See application file for complete search history.

(56) References Cited

U.S. PATENT DOCUMENTS

| 2011/0212739 | A1 | 9/2011 | Pedersen et al. | 455/501 |
| 2011/0310760 | A1* | 12/2011 | Wu et al. | 370/252 |

(Continued)

FOREIGN PATENT DOCUMENTS

| CN | 102638803 A | 8/2012 |
| CN | 102770825 A | 11/2012 |

(Continued)

OTHER PUBLICATIONS

International Search Report and Written Opinion of International Search Authority for PCT/CN2014/076380 dated Aug. 4, 2014 (13 pages).

(Continued)

*Primary Examiner* — Chi H Pham
*Assistant Examiner* — Soon-Dong D Hyun
(74) *Attorney, Agent, or Firm* — Imperium Patent Works; Zheng Jin; Darien Wallace (57) ABSTRACT

A method of maximum output power configuration with UE preference in carrier aggregation is provided. A UE configures multiple component carriers (CCs) with carrier aggregation for communicating with a serving base station in a mobile communication network. The UE determines channel condition of multiple serving cells over the corresponding multiple CCs. The UE then determines maximum output power for each CC based at least in part on the corresponding channel condition of each CC. Finally, the UE transmits power headroom report (PHR) for each CC to the serving base station, wherein the PHR is calculated based on the determined maximum output power. As a result, the reported PH information is channel condition dependent, which can be used by eNB for facilitating better transmission scheduling.

20 Claims, 6 Drawing Sheets

(51) Int. Cl.
*H04L 5/00* (2006.01)
*H04W 52/14* (2009.01)
*H04W 52/34* (2009.01)
*H04B 17/336* (2015.01)

(52) U.S. Cl.
CPC ........... *H04W 52/146* (2013.01); *H04W 52/241* (2013.01); *H04W 52/34* (2013.01)

(56) References Cited

U.S. PATENT DOCUMENTS

| | | | |
|---|---|---|---|
| 2012/0082043 A1 | 4/2012 | Hwang et al. | 370/252 |
| 2012/0113915 A1* | 5/2012 | Chen et al. | 370/329 |
| 2012/0127933 A1* | 5/2012 | Worrall et al. | 370/329 |
| 2012/0147801 A1 | 6/2012 | Ho et al. | 370/311 |
| 2012/0178494 A1* | 7/2012 | Haim et al. | 455/522 |
| 2012/0207112 A1* | 8/2012 | Kim et al. | 370/329 |
| 2013/0044621 A1 | 2/2013 | Jung et al. | 370/252 |
| 2013/0324182 A1* | 12/2013 | Deng et al. | 455/522 |
| 2014/0064129 A1* | 3/2014 | Sane et al. | 370/252 |

FOREIGN PATENT DOCUMENTS

| | | |
|---|---|---|
| WO | WO2011107431 A1 | 9/2011 |
| WO | WO2012095693 A2 | 7/2012 |

OTHER PUBLICATIONS

EPO, Search Report for the EP patent application 14789118.8 dated Oct. 14, 2015 (8 pages).

3GPP TSG-RAN WG2 Meeting #72bis R2-110139, Alcatel-Lucent et al., PCMAX,c Signaling Optimization, Dublin, Ireland dated Jan. 17-21, 2011 (4 pages).

* cited by examiner (PRIOR ART)
FIG. 1

| Modulation | Channel bandwidth / Transmission bandwidth ($N_{RB}$) | | | | | | MPR (dB) |
|---|---|---|---|---|---|---|---|
| | 1.4 MHz | 3.0 MHz | 5 MHz | 10 MHz | 15 MHz | 20 MHz | |
| QPSK | > 5 | > 4 | > 8 | > 12 | > 16 | > 18 | ≤ 1 |
| 16 QAM | ≤ 5 | ≤ 4 | ≤ 8 | ≤ 12 | ≤ 16 | ≤ 18 | ≤ 1 |
| 16 QAM | > 5 | > 4 | > 8 | > 12 | > 16 | > 18 | ≤ 2 |

FIG. 5A

| Modulation | CA bandwidth Class C | | | MPR (dB) |
|---|---|---|---|---|
| | 50 RB + 100 RB | 75 RB + 75 RB | 100 RB + 100 RB | |
| QPSK | > 12 and ≤ 50 | > 16 and ≤ 75 | > 18 and ≤ 100 | ≤ 1 |
| QPSK | > 50 | > 75 | > 100 | ≤ 2 |
| 16 QAM | ≤ 12 | ≤ 16 | ≤ 18 | ≤ 1 |
| 16 QAM | > 12 and ≤ 50 | > 16 and ≤ 75 | > 18 and ≤ 100 | ≤ 2 |
| 16 QAM | > 50 | > 75 | > 100 | ≤ 3 |

FIG. 5B

| | | |
|---|---|---|
| $M_A$ | 8.2 | 0 ≤ A < 0.025 |
| | 9.2-40A | 0.025 ≤ A < 0.05 |
| | 8-16A | 0.05 ≤ A < 0.25 |
| | 4.83-3.33A | 0.25 ≤ A ≤ 0.4 |
| | 3.83-0.83A | 0.4 ≤ A ≤ 1 |

$$MPR = CEIL\{M_A, 0.5\}$$
$$\text{where, } A = N_{RB\_alloc} / N_{RB\_agg}$$

FIG. 5C

| CA_1C | RB$_{start}$ | L$_{CRB}$ [RBs] | RB$_{start}$ + L$_{CRB}$ [RBs] | A-MPR for QPSK and 16-QAM[dB] |
|---|---|---|---|---|
| 100 RB / 100 RB | 0 – 23 & 176-199 | >0 | n/a | ≤12.0 |
| | 24 – 105 | >64 | n/a | ≤6.0 |
| | 106-175 | n/a | >175 | ≤5.0 |
| 75 RB / 75 RB | 0 – 6 & 143-149 | 0<L$_{CRB}$ ≤ 10 | n/a | ≤ 11.0 |
| | | >10 | n/a | ≤ 6.0 |
| | 7-90 | >44 | n/a | ≤ 5.0 |
| | 91-142 | n/a | >142 | ≤ 2.0 |

Note 1: RB$_{start}$ indicates the lowest RB index of transmitted resource blocks
Note 2: L$_{CRB}$ is the length of a contiguous resource block allocation
Note 3: For intra-subframe frequency hopping which intersects regions, notes 1 and 2 apply on a per slot basis
Note 4: For intra-subframe frequency hopping which intersects regions, the larger A-MPR value may be applied for both slots in the subframe

FIG. 6A

MPR = CEIL {M$_A$, 0.5}, where A = N$_{RB\_alloc}$ / N$_{RB\_agg}$.

| M$_A$ | -22.5 A + 17 | 0 ≤ A < 0.20 |
|---|---|---|
| | -11.0 A + 14.7 | 0.20 ≤ A < 0.70 |
| | -1.7 A + 8.2 | 0.70 ≤ A ≤ 1 |

FIG. 6B

INVERSE OF CHANNEL POWER GAIN
POWER ALLOCATION TO THE CHANNEL

MAXIMUM OUTPUT POWER CONFIGURATION WITH UE PREFERENCE IN CARRIER AGGREGATION

CROSS REFERENCE TO RELATED APPLICATIONS

This application claims priority under 35 U.S.C. §119 from U.S. Provisional Application No. 61/816,264, entitled "Method of UE Pmax Configuration for Carrier Aggregation System," filed on Apr. 26, 2013, the subject matter of which is incorporated herein by reference.

TECHNICAL FIELD

The disclosed embodiments relate generally to wireless network communications, and, more particularly, to maximum output power configuration with UE preference in carrier aggregation.

BACKGROUND

A Long-Term Evolution (LTE) system offers high peak data rates, low latency, improved system capacity, and low operating cost resulting from simple network architecture. An LTE system also provides seamless integration to older wireless network, such as GSM, CDMA and Universal Mobile Telecommunication System (UMTS). Enhancements to LTE systems are considered so that they can meet or exceed International Mobile Telecommunications Advanced (IMT-Advanced) fourth generation (4G) standard. One of the key enhancements is to support bandwidth up to 100 MHz and be backwards compatible with the existing wireless network system. Carrier aggregation (CA) is introduced to improve system throughput. With carrier aggregation, the LTE-Advanced system can support peak target data rates in excess of 1 Gbps in the downlink (DL) and 500 Mbps in the uplink (UL). Such technology is attractive because it allows operators to aggregate several smaller contiguous or non-continuous component carriers (CC) to provide a larger system bandwidth, and provides backward compatibility by allowing legacy users to access the system by using one of the component carriers.

Figure 1:
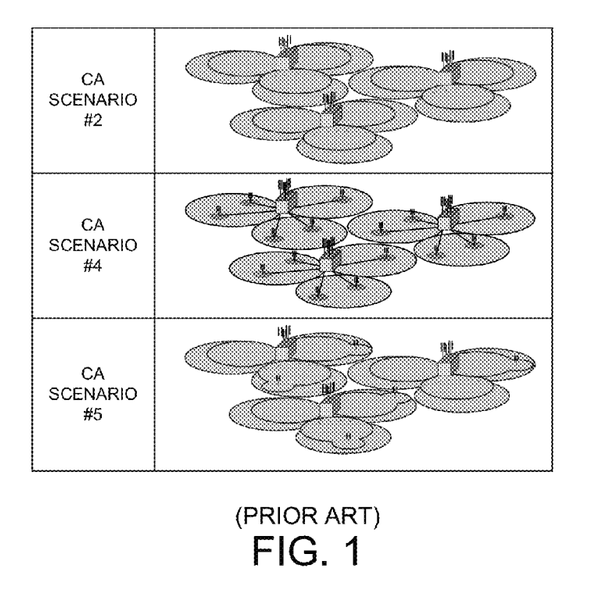
FIG. 1 (prior art) illustrates different carrier aggregation scenarios in LTE/LTE-A systems.

LTE/LTE-A has also defined different CA scenarios. FIG. 1 (Prior Art) illustrates CA scenarios #2, #4, and #5, where different channel characteristics are experienced for radio signals on different carriers. For CA scenario #2, component carriers are in different frequency bands (e.g., F1 and F2). F1 and F2 cells are co-located and overlaid, but F2 has smaller coverage due to larger path loss. Only F1 provides sufficient coverage and F2 is used to improve throughput. Mobility is performed based on F1 coverage. It is expected that aggregation is possible between overlaid F1 and F2 cells. For CA scenario #4, CCs are in different frequency bands (e.g., F1 and F2) and the DL transmission sites are not co-located. F1 provides macro coverage, and Remote Radio Heads (RRHs) are used to improve throughput at hot spots on F2. Mobility is performed on F1 coverage. It is expected that F2 RRH cells can be aggregated with the underlying F1 macro cells. In CA scenario #5, CCs are in different frequency bands (e.g., F1 and F2) and the DL transmission sites are not co-located. CA scenario #5 is similar to CA scenario #2, but frequency selective repeaters are deployed so that coverage is extended for one of the carrier frequencies. It is expected that F1 and F2 cells of the same base station can be aggregated where coverage overlaps.

In general, transmission on the carrier with better channel characteristics is preferred to increase system throughput and to reduce UE power consumption. In LTE/LTE-A systems, the network is responsible for both DL and UL scheduling. As a result, the network should prioritize DL/UL transmission on the carrier with better channel condition. From UE perspective, there are mechanisms that are related to carrier selection at eNB side. Those mechanisms include Channel State Information (CSI) reporting for DL channel information, Sounding Reference Signal (SRS) transmission for UL channel sounding, and power headroom report (PHR) for UE maximum transmit power configuration. From the perspective of the 3GPP specifications, there is opportunity for UE to improve UL transmission efficiency (for both spectral efficiency and power consumption) via UE maximum transmit power configuration.

SUMMARY

A method of maximum output power configuration with UE preference in carrier aggregation is provided. A UE configures multiple component carriers (CCs) with carrier aggregation for communicating with a serving base station in a mobile communication network. The UE determines channel condition of multiple serving cells over the corresponding multiple CCs. The UE then determines maximum output power for each CC based at least in part on the corresponding channel condition of each CC. Finally, the UE transmits power headroom report (PHR) for each CC to the serving base station, wherein the PHR is calculated based on the determined maximum output power. As a result, the reported PH information is channel condition dependent, which can be used by eNB for facilitating efficient UL transmission scheduling.

A UE uses PHR mechanism to periodically provide its serving eNB with its power headroom (PH), which is defined as a power offset between a UE-configured maximum transmit power ($P_{CMAX}$) and a UE-calculated current UE transmit power. The room for $P_{CMAX}$ flexibility is from the different Maximum Power Reductions (MPRs). In general, UEs are desired to use the actual power reduction needed and not the maximum allowed MPR, to maximize system performance. Therefore, it is very likely that after necessary power reduction, there is still some amount of selection range for $P_{CMAX}$. As a result, UE can determines its desired power reduction and $P_{CMAX}$ for each carrier additionally according to the corresponding channel characteristics, and then report PH information to its serving base station. Upon receiving this channel-dependent PH information, in addition to power control, the serving base station can perform UL scheduling accordingly.

In a first embodiment of maximum output power configuration (e.g., water filling), a maximum output power plus an inverse of a channel power gain for each CC is approximately equal to each other when each CC has the same channel bandwidth. If the CCs have different channel bandwidth, then each CC is first divided into sub-channels having the same sub-channel bandwidth. A maximum output power plus an inverse of a channel power gain for each sub-channel is approximately equal to each other.

In a second embodiment of maximum output power configuration (e.g., binary selection), each maximum output power is ranged within a low limit and a high limit. The UE determines the high limit as the configured maximum transmit power for a first serving cell having a better channel condition, and the UE determines the low limit as the configured maximum transmit power for a second serving cell having a poorer channel condition.

In a third embodiment of maximum output power configuration (e.g., statistical spectral efficiency), each maximum output power for each CC is determined to be approximately proportional to an average spectral efficiency of each corresponding CC.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 2:
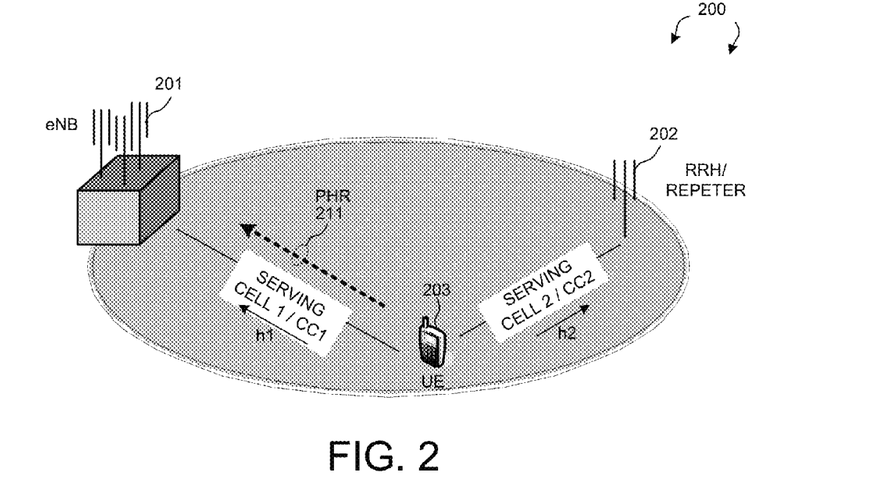
FIG. 2 illustrates UE-configured maximum output power control in accordance with one novel aspect in a wireless communication system.

FIG. 2 illustrates UE-configured maximum output power control in accordance with one novel aspect in a wireless communication system 200. Wireless communication system 200 comprises a base station eNB 201, a remote radio header (RRH) or repeater 202, and a user equipment UE 203. With carrier aggregation (CA), UE 203 is configured with multiple component carriers (CCs) and served in multiple serving cells. For example, UE 203 is served by eNB 201 in serving cell 1 over CC1 and by RRH 202 in serving cell 2 over CC2. Under CA, different CCs have different channel characteristics, especially when the CCs are in different frequency bands or when the transmitting sites are different. In principle, transmission on the carrier with better channel characteristics is preferred to increase system throughput and to reduce UE power consumption. In LTE/LTE-A systems, the network is responsible for both DL and UL scheduling. As a result, the network should prioritize DL/UL transmission on the carrier with better channel condition. From UE perspective, there are mechanisms to facilitate carrier selection at eNB side. For example, there is opportunity for UE to improve uplink (UL) transmission efficiency (for both spectral efficiency and power consumption) via UE maximum transmit power configuration.

Orthogonal frequency division multiplexing (OFDM) radio technology has been incorporated into LTE/LTE-A because it enables high data bandwidth to be transmitted efficiently while still providing a high degree of resilience to reflections and interference. In OFDM communication systems, the transmit power of each mobile station (UE) needs to be maintained at a certain level and regulated by the network (via serving eNB). However, the maximum transmit power of each UE is UE-configurable and is different depending on UE capacity, modulation order of transmission date, and transmission bandwidth, etc. (Extended) Power headroom report (PHR) is a mechanism to allow the UE to provide its power capacity and usage to the network. A UE uses PHR mechanism to periodically provide its serving eNB with its power headroom (PH), which is defined as a power offset between a UE-configured maximum transmit power and a UE-calculated current UE transmit power. Based on the received PH information, the serving eNB can regulate the UE transmit power with proper resource allocation.

In the example of FIG. 2, UE 203 uses transmit power h1 for UL transmission in serving cell 1 over CC1, and uses transmit power h2 for UL transmission in serving cell 2 over CC2. UE 203 then reports PHR 211 for both CC1 and CC2 to its serving eNB 201. Based on the received PH information, eNB 201 regulates the UE transmit power with proper resource allocation. The PH information is calculated based on UE-configured maximum transmit power, which in turn is calculated based on various parameters including maximum power reduction (MPR) depending on UE capability and configuration. In general, MPRs are the maximum allowed power reduction value, and UEs are desired to use the actual power reduction needed and not the maximum allowed in order to maximize the system performance. Therefore, it is very likely that after necessary power reduction, there is still some amount of selection range for the UE-configured maximum transmit power. In accordance with one novel aspect, UE 203 first evaluates the channel characteristics of each carrier, and reports the PH information for each carrier that is additionally adjusted based on the evaluation. As a result, the reported PH information is channel condition dependent, which can be used by eNB 201 for facilitating better DL/UL transmission scheduling.

Figure 3:
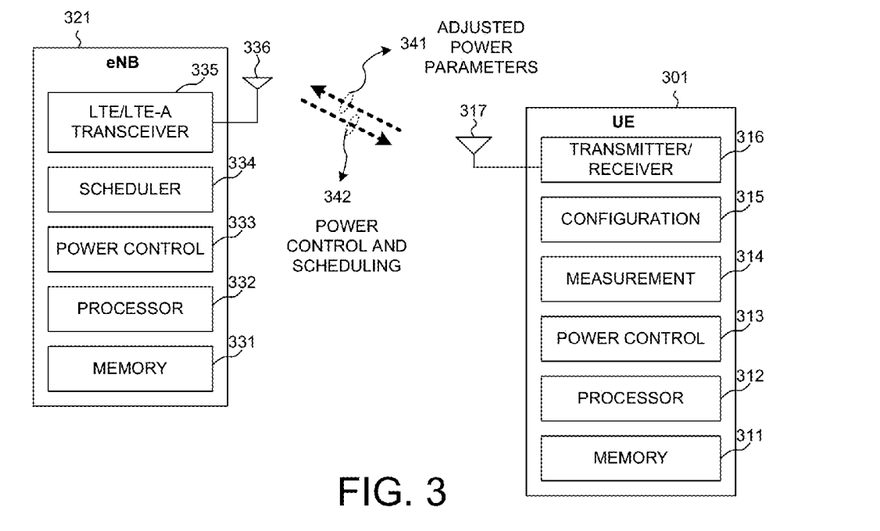
FIG. 3 illustrates simplified block diagrams of a UE and a base station (eNodeB) having power control modules in accordance with one novel aspect.

FIG. 3 illustrates simplified block diagrams of a user equipment UE 301 and a base station eNB 321 having power control modules in accordance with one novel aspect. UE 301 comprises memory 311, a processor 312, a power control module 313, a measurement module 314, a configuration module 315, and a transmitter and receiver 316 coupled to antenna 317. Similarly, eNB 321 comprises memory 331, a processor 332, a power control module 333, a scheduler 334, and a transmitter and receiver 335 coupled to antenna 336. In the transmitting direction, the transceivers convert received baseband signals from the processors to RF signals and send out to the antennas. In the receiving direction, the processors process the received baseband signals from the transceivers and invoke different functional modules to perform various features in the UE and the eNB. The functional modules may be implemented by hardware, firmware, software, or any combination thereof. The function modules, when executed by the processors (e.g., via executing program codes stored in the memory), allow UE 301 to measure and estimate channel characteristics of each carrier (via measurement module 314), to calculate desired power headroom information for each carrier (via power control module 313), and to receive corresponding power configuration and scheduling information from the network for uplink power control and transmission (via configuration module 315). In one example, UE 301 transmits adjusted power parameters 341 to eNB 321 based on estimated channel characteristics. In response, UE 301 receives power configuration and scheduling information 342 from eNB 321 for enhanced transmission efficiency (for both spectral efficiency and UE power consumption).

In LTE/LTE-A systems, the UE transmit power $P_{PUSCH}(i)$ on a sole physical uplink shared channel (PUSCH) is defined by Eq. (1):

$$P_{PUSCH}(i)=\min\{P_{CMAX}, 10 \log_{10}(M_{PUSCH}(i))+ P_{O\_PUSCH}(j)+\alpha(j)*PL+\Delta_{TF}(i)+f(i)\} \quad (1)$$

where
$M_{PUSCH}(i)$, $f(i)$ are parameters given by physical downlink control channel (PDCCH) grant from the eNB (Group A)
$P_{O\_PUSCH}(j)$, $\alpha(j)$, $\Delta_{TF}(i)$ are parameters signaled by radio resource control (RRC) from the eNB (Group B)
$P_{CMAX}$ (UE-configured maximum transmitting power), PL (pathloss) are parameters determined by the UE (Group C)

In LTE/LTE-A systems, the UE transmitting power is typically controlled by its serving eNB. Because the eNB does not know the UE's power capacity and power usage, the UE uses a power headroom report (PHR) mechanism to periodically provide the serving eNB with its power headroom (PH) value, which is defined as a power offset between a UE-configured maximum transmitting power (e.g., $P_{CMAX}$) and a UE-calculated current transmitting power (e.g., $P_{PUSCH}$). Based on the reported PH and $P_{CMAX}$, the eNB then controls the UE transmitting power accordingly. For example, the eNB may change the UE transmitting power by adjusting the number of resource blocks, the modulation and coding scheme in Group A, or by adjusting other power control parameters in Group B.

Figure 4:
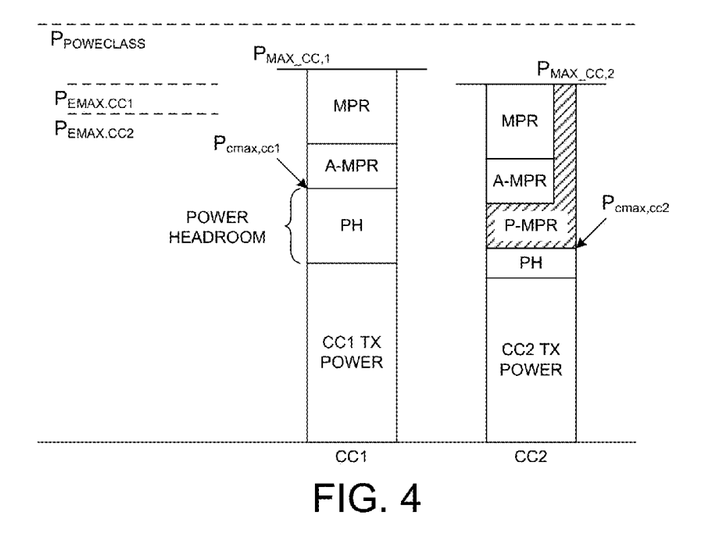
FIG. 4 illustrates maximum output power control and maximum power reduction in carrier aggregation in accordance with one novel aspect.

FIG. 4 illustrates maximum output power control and maximum power reduction in carrier aggregation in accordance with one novel aspect. The power headroom value $PH_C$ for carrier C of the UE is defined in Eq. (2), while the UE-configured maximum output power $P_{CMAX,c}$ for carrier C is defined in Eq. (3):

$$PH_c = P_{CMAX,c} - UE \text{ transmit Power} \quad (2)$$

$$P_{CMAX\_L,c} <= P_{CMAX,c} <= P_{CMAX\_H,c} \quad (3)$$

where $$P_{CMAC\_H,c}=\text{MIN}\{P_{EMAX,c}, P_{POWERCLASS}\} \quad (4)$$

$$P_{CMAX\_L,c}=\text{MIN}\{P_{EMAX,c}-\Delta T_C, P_{POWERCLASS}-\text{MAX}(\text{MPR}+A\text{-MPR}, P\text{-MPR})-\Delta T_C\} \quad (5)$$

(for intra-bond contiguous CA)

$$P_{CMAX\_L,c}=\text{MIN}\{P_{EMAX,c}-\Delta T_{C,c}, P_{POWERCLASS}-\text{MAX}(\text{MPR}_c+A\text{-MPR}_c+\Delta T_{IB,c}, P\text{-MPR}_c)-\Delta T_{C,c}\} \quad (6)$$

(for inter-band CA)
$P_{EMAx}$ is configured by the network via higher layers
$P_{POWERCLASS}$ is the maximum UE output power.
Maximum Power Reduction (MPR): the maximum allowed reduction of maximum power of certain modulation order and the number of resource blocks.
Additional Maximum Power Reduction (A-MPR): the maximum allowed reduction of maximum power for the number of resource blocks and the band.

P-MPR is the power management term for Maximum Power Reduction. P-MPR is a UE-controlled parameter to meet SAR requirement due to proximity.
$\Delta_{TC}$=1.5 dB when the CC at the edge of a band; 0 dB otherwise.

According to Eq. (5) and (6), the lower bound of the UE-configured maximum transmitting power $P_{CMAX\_L,c}$ is controlled by the maximum UE output power $P_{POWERCLASS}$ and the MPR, A-MPR, and P-MPR. Therefore, by increasing MPR, A-MPR, and/or P-MPR, the value of $P_{CMAX}$ can be decreased. For example, assuming $P_{POWERCLASS}$=23 dB, MPR=2 dB, and A-MPR=1 dB. If there is no P-MPR (e.g., for CC1), then the maximum transmitting power $P_{CMAX,cc1}$ is 20 dB (e.g., as depicted by $P_{CMAX}$ 401 in FIG. 4). However, if P-MPR=6 dB is introduced (e.g., for CC2), then the maximum transmitting power $P_{CMAX,cc2}$ is decreased to 17 dB. Similarly, the value of MPR or A-MPR will also affect $P_{CMAX}$. In general, MPR is affected by the modulation order and the number of resource blocks while A-MPR is affected by the number of resource blocks and the band. Depending on UE implementation, P-MPR can be affected by the band, and the number of resource blocks, and the modulation order, and receiver sensitivity of coexisting modems, etc. According to Eq. (5) and (6), the total maximum power reduction is the bigger one between (MPR+A-MPR) and (P-MPR).

Upon receiving a lower $P_{CMAX}$ or a smaller PH value from the UE, the eNB is likely to decrease the UE transmitting power by, e.g., reducing resource allocation or changing modulation order. Furthermore, for carrier aggregation scenario, the eNB is likely to adjust UL transmission scheduling for the UE for each carrier based on the reported PH information. As a result, the maximum transmit power control mechanism can be used for UE to show its preference between component carriers for UL transmission—the UE prefers the component carrier with higher configured maximum transmit power. Therefore, if the maximum transmit power configuration is channel condition dependent, then it can help improving UE UL transmission efficiency.

Figure 5A:
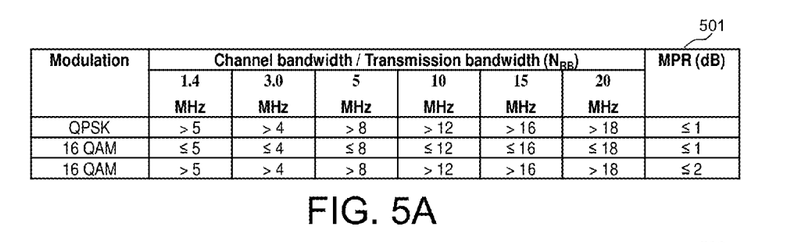
FIG. 5A illustrates an example of MPR for non-CA and inter-band CA.

FIG. 5A illustrates an example of MPR for non-CA and inter-band CA. Inter-band CA refers to aggregation between non-contiguous carriers that belong to different EUTRA frequency operating bands. As shown in Table 501 of FIG. 5A, for non-CA and inter-band CA case, the allowed value of MPR varies from 1 dB to 2 dB when the modulation and channel bandwidth changes.

Figure 5B:
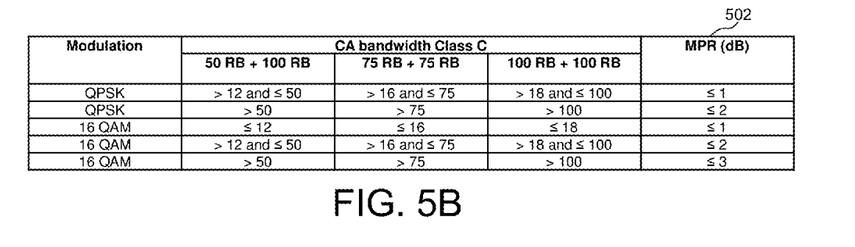
FIG. 5B illustrates an example of MPR for intra-band contiguous CA.

FIG. 5B illustrates an example of MPR for intra-band contiguous CA. Intra-band contiguous CA refers to aggregation between carriers that belong to same EUTRA frequency operating bands and are contiguous in frequency domain. As shown in Table 502 of FIG. 5B, for intra-band CA case, the value of MPR varies from 1 dB to 3 dB when the modulation and the CA bandwidth changes.

Figure 5C:
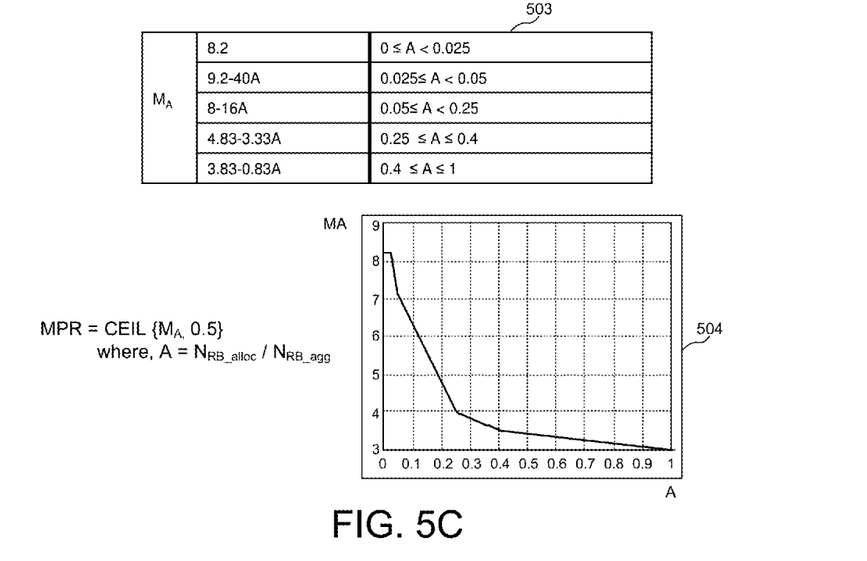
FIG. 5C illustrates an example of MPR for intra-band contiguous CA due to multi-cluster transmission.

FIG. 5C illustrates an example of MPR for intra-band contiguous CA due to multi-cluster transmission. Multi-cluster transmission refers to data transmission via non-contiguous radio resource blocks over aggregated component carriers. The value of MPR is a function of resource allocation ratio A as depicted in FIG. 5C:

$$\text{MPR}=\text{CEIL}\{M_A, 0.5\} \quad (7)$$

Where
$A=N_{RB\_alloc}/N_{RB\_agg}$ is the resource allocation ratio
$N_{RB\_alloc}$ is the total number of allocated resource blocks
$N_{RB\_agg}$ is the total number of aggregated resource blocks
Table 503 in FIG. 5C shows that, for different resource allocation ratio A, the value of MPR varies a lot. For example, if A is relatively small (e.g., 0<=A<0.025), then $M_A$ is capped at 8.2 dB. As shown in chart 504 of FIG. 5C, the value of $M_A$ ranges from 3 dB to 8 dB depending on A, which provides a lot of flexibility for UE-configured maximum transmit power $P_{CMAX}$.

Besides MPR, A-MPR is the addition maximum power reduction that is allowed to meet additional adjacent channel leakage ratio (ACLR) and spectrum emission requirements signaled by the network. For UEs that are configured with carrier aggregation, UEs receive CA network signaling (CA_NS) value in RRC messaging. MPR is not applicable, i.e., MPR=0 dB. In general, A-MPR depends on CA_NS value and band combination.

Figure 6A:
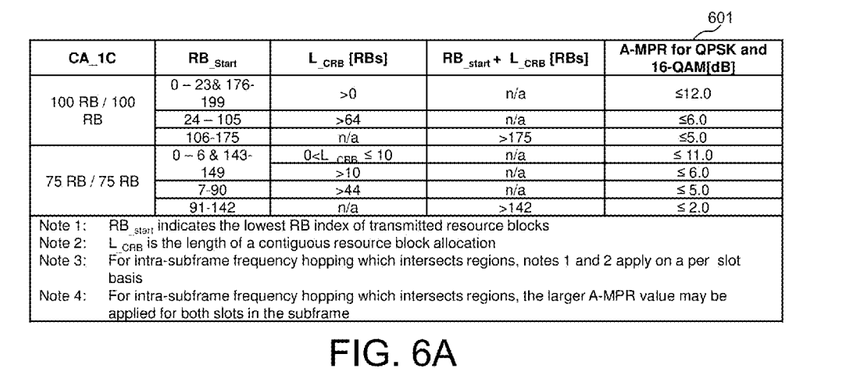
FIG. 6A illustrates an example of A-MPR for intra-band contiguous CA.

FIG. 6A illustrates an example of A-MPR for intra-band contiguous CA, i.e., for CA_NS_01 and CA_1C. As shown in Table 601 of FIG. 6A, the value of A-MPR for QPSK and 16-QAM varies from 2 dB to 12 dB depending on different resource block allocation.

Figure 6B:
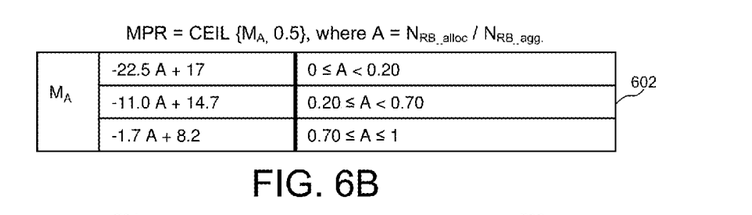
FIG. 6B illustrates an example of A-MPR for intra-band contiguous CA due to multi-cluster transmission.

FIG. 6B illustrates an example of A-MPR for intra-band contiguous CA due to multi-cluster transmission. Similar to MPR, the value of A-MPR in multi-cluster transmission scenario depends on the resource allocation ratio A. As depicted by Table 602 in FIG. 6B, A-MPR can be represented by the following equation:

$$A\text{-MPR} = \text{CEIL}\{M_A, 0.5\} \quad (8)$$

Where
$A = N_{RB\_alloc}/N_{RB\_agg}$ is the resource allocation ratio
$N_{RB\_alloc}$ is the total number of allocated resource blocks
$N_{RB\_agg}$ is the total number of aggregated resource blocks Based on the above illustration, it can be seen that the room for $P_{CMAX}$ flexibility is from the different MPRs. In general, UEs are desired to use the actual power reduction needed and not the maximum allowed MPR, to maximize system performance. Therefore, it is very likely that after necessary power reduction, there is still some amount of selection range for $P_{CMAX}$. As a result, UE can determines its desired power reduction and $P_{CMAX}$ for each carrier additionally according to the corresponding channel characteristics, and then report PH information to its serving base station. Upon receiving this channel-dependent PH information in addition to power control, the serving base station can perform UL scheduling accordingly. For example, for a first CC1 with better channel condition, the UE selects the actual power reduction needed. On the other hand, for a second CC2 with poorer channel condition, the UE selects the maximum allowed power reduction instead. This way, the eNB is more likely to schedule the UE for UL transmission over the better channel CC1 (e.g., with relatively higher $P_{CMAX}$ due to relatively lower MPRs), which improves UE UL transmission efficiency.

Figure 7:
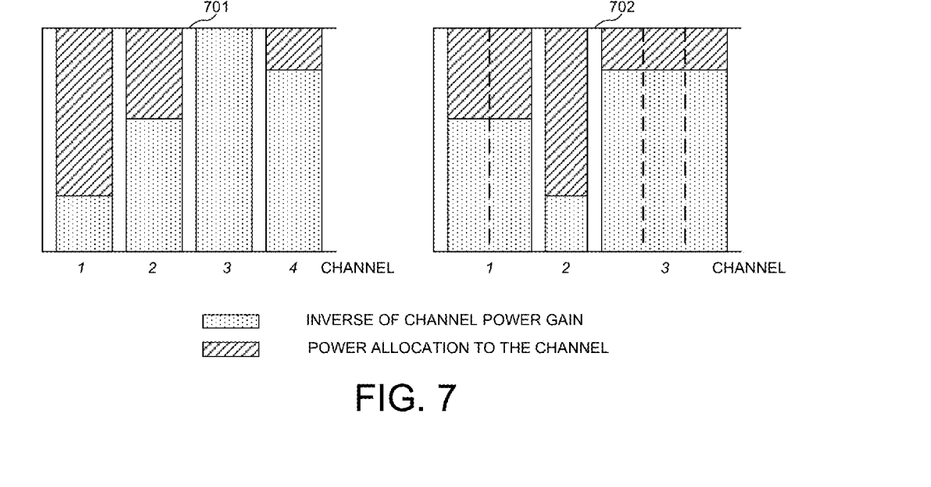
FIG. 7 illustrates one embodiment of water-filling based maximum power control.

FIG. 7 illustrates a first embodiment of water-filling based maximum power configuration method. In chart 701 of FIG. 7, a UE is configured with four component carriers CC1 to CC4, and each CC has the same channel bandwidth. With water-filling based maximum power configuration method, the power allocation $P_i$ to each CCi plus the inverse of channel power gain ($g_i$) of each CCi is equal to a to-be-determined (TBD) constant, as expressed in the following equations:

$$P_i + \frac{1}{g_i} = \mu, \text{ where } \mu \text{ is a TBD constant}$$

$$\Rightarrow \sum_{i=0}^{n} P_i + \frac{1}{g_i} = n\mu, \text{ where}$$

$$\sum_{i=0}^{n} P_i = P_T \text{ is the max. power constraint}$$

$$\Rightarrow \mu = \frac{1}{n}\left(P_T + \sum_{i=0}^{n} \frac{1}{g_i}\right)$$

$$\Rightarrow P_i = \frac{1}{n}\left(P_T + \sum_{i=0}^{n} \frac{1}{g_i}\right) - \frac{1}{g_i}, \text{ subject to}$$

$$P_{cmax\_L,i} < P_i < P_{cmax\_H,i}$$

It is noted in the above equations that the calculated power allocation $P_i$ is constrained by the allowed maximum transmit power range. The channel power gain $g_i$ can be replaced with the channel Signal to noise ratio (SNR) or Signal to interference plus noise ratio (SINR), and still achieves desired results. The UL SNR/SINR at UE side can be estimated in TDD mode due to channel reciprocity. In FDD mode, however, UE can estimate its UL SNR/SINR based on its expectation. For example, the code rate of UL TX is notified by eNB, including transport block size (TBS), modulation, number of physical resource blocks (PRBs), and transmit power. The UE can generate a performance curve based on its expectation, i.e., the UE expects a received SNR/SINR for successful decoding of such code rate. Combined with UL TX power and PRBs, the UE can calculate the channel power gain accordingly.

In chart 702 of FIG. 7, a UE is configured with three component carriers CC1 to CC3 having different channel bandwidth. In such scenario, the entire bandwidth is first divided into equal pieces with the same resolution. For example, the entire bandwidth is divided into 5 sub-channels with equal bandwidth. CC1 contains two sub-channels, CC2 contains one sub-channel, and CC3 contains three sub-channels. The same water-filling principle can be applied to the six sub-channels as depicted in chart 701.

The water filling method, as its name suggests, is based on the fundamental communication concept, i.e., water filling. The UE throughput can be maximized from such perspective. Using water filling for maximum power configuration based on channel condition is beneficial, because it enables weighted power scaling when total computed power exceeds maximum power limitation. The CC with better channel condition is weighted more and thus is allocated and scheduled with more UL transmission power, which improves spectral efficiency and reduces power per bit in UL at UE side.

In a second embodiment, a binary selection method is applied for maximum power configuration. The UE-configured maximum output power $P_{CMAX}$ has both lower limit $P_{CMAX\_L}$ and upper limit $P_{CMAX\_H}$ that are dictated based on the 3GPP specifications. In the binary selection method, the upper limit is selected for a channel having better power gain, while the lower limit is selected for a channel having poorer power gain. For example, if there are two component carriers CC1 and CC2, and the channel power gain of CC1 g1 is better than the channel of CC2 g2 (e.g., g1>g2). According to Eq. (2), $P_{CMAX\_L,1} \leq P_{CMAX,1} \leq P_{CMAX\_H,1}$ for CC1, and $P_{CMAX\_L,2} \leq P_{CMAX,2} \leq P_{CMAX\_H,2}$ for CC2. Applying the binary selection method for maximum power configuration, $P_{CMAX,1} = P_{CMAX\_H,1}$ for CC1 and $P_{CMAX,2} = P_{CMAX\_L,2}$ for CC2. For cases that the number of aggregated CCs is larger, a threshold channel power gain ($g_{theshold}$) can be set to determine the power configuration. For example, if the channel power gain for CCi is $g_i$, then:

$$\min_i\{g_i\} \le g_{threshold} \le \max_i\{g_i\}$$

$$P_{cmax,i} = \begin{cases} P_{cmax\_H,i} & g_i \ge g_{threshold} \\ P_{cmax\_L,i} & g_i < g_{threshold} \end{cases}$$

Where $g_{theshold}$ can be a function of $g_i$ (e.g., $g_{threshold}$ is the average of $g_i$).

The binary selection method also enables weighted power scaling when total computed power exceeds maximum power limitation. Such method is UE power consumption friendly. By using the CC with better channel, power consumption per bit at UE side is reduced. The channel condition (channel power gain/path loss or SNR/SINR) can be estimated in a similar way as in the first water-filling embodiment. It is noticed that in the second binary selection embodiment, the UE only needs to estimate the relative channel condition among the CCs, not the absolute channel condition for each CC. As long as the UE can estimate which CC has a better or poorer channel condition as compared to another CC, then the UE is able to apply the binary selection method for maximum output power control based on channel condition.

In a third embodiment, maximum power configuration is based on statistical spectral efficiency. Assume that the observed average spectral efficiency for CCi is $\eta_i$:

$$\eta_i = \log_2(1 + \hat{P}_i \cdot \gamma_i)$$

$$\Rightarrow \hat{P}_i = \frac{2^{\eta_i}}{\gamma_i} - 1$$

Accordingly, $P_{CMAX,i}$ is set to fulfill:

$$P_{cmax,1} : P_{cmax,2} : \ldots = \hat{P}_1 : \hat{P}_2 : \ldots \text{ subject to: } P_{cmax\_L,i} \le P_{cmax,1} \le P_{cmax\_H,i}$$

Where
- $\eta_i$ is the observed average spectral efficiency for CCi. In principle, UE knows the amount of total transmitted data within a period of time. In addition, UE knows what amount of resources are used to transmit that amount of data. The ratio of them can be used as an estimate to the average spectral efficiency.
- $\hat{P}_i$ is the transmit power needed for CCi to realize the average spectral efficiency $\eta_i$ if the channel signal-to-interference plus noise ratio is $\gamma_i$.

Such maximum power configuration is based on realistic spectral efficiency of each carrier and enables weighted power scaling when total computed power exceeds maximum power limitation. It reduces power per bit for UL transmission at UE side.

Figure 8:
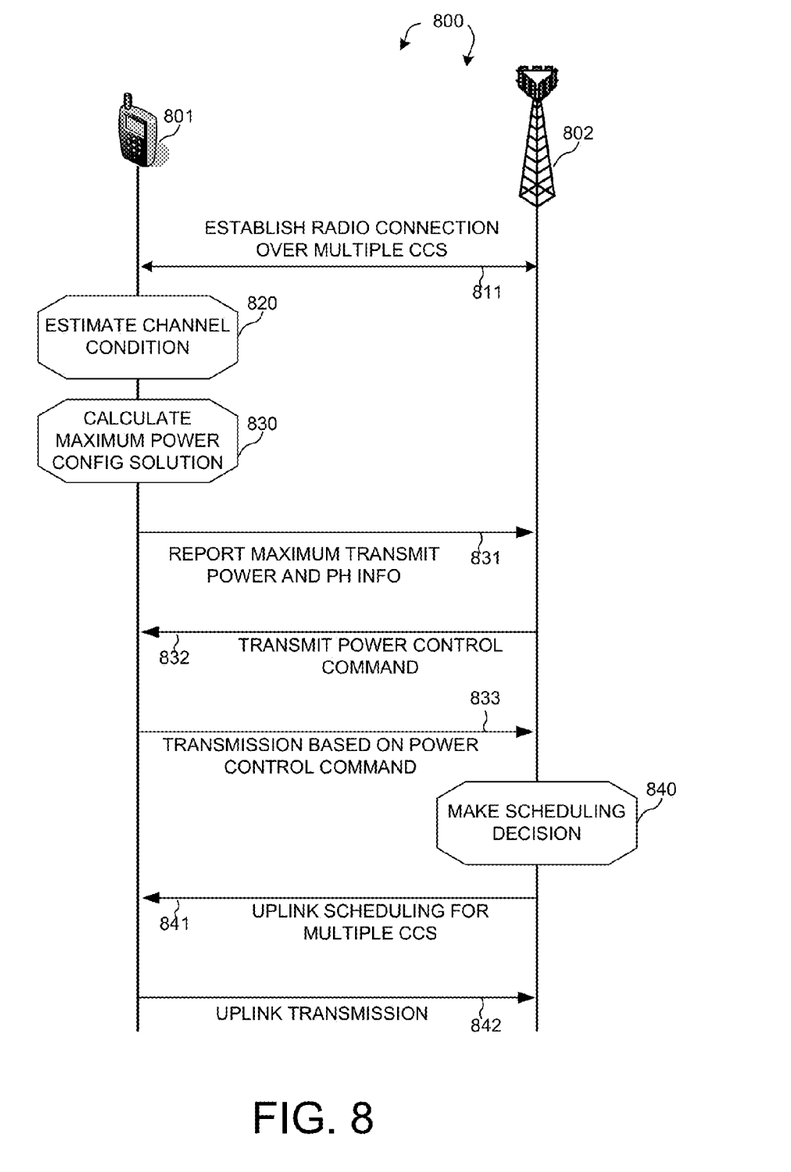
FIG. 8 illustrates one embodiment of maximum output power control with UE preference based on channel condition of different CCs.

FIG. 8 illustrates one embodiment of maximum output power configuration with UE preference based on channel condition of different CCs. Mobile communication network 800 comprises a user equipment UE 801 and a serving base station eNB 802. In step 811, UE 801 establishes a radio connection with eNB 802 over multiple component carriers under carrier aggregation. UE 801 is served in a primary serving cell over a primary CC (PCC) as well as one or more secondary serving cells over one or more secondary CCs (SCCs). Because different carrier frequency, channel bandwidth, and other network condition, each CC has its own channel characteristics, which may be estimated via channel power gain, SNR/SINR, and spectral efficiency. In step 820, UE 801 estimates the UL channel condition (e.g., the channel quality indicator (CQI)) for each CC. In TDD mode, the UL channel condition can be estimated based on the DL channel condition due to channel reciprocity. In FDD mode, the UL channel condition can be estimated based on UE expectation (e.g., an expected received SINR for successful decoding under a specific code rate) combined with UL TX power and the number of allocated physical resource blocks (PRBs) for UL transmission. In step 830, UE 801 calculates maximum power configuration based on the estimated channel conditions, e.g. applying one of the maximum power configuration methods illustrated above in three embodiments.

In step 831, UE 801 reports UE-configured maximum transmit power and PH information to eNB 802. The PH information is calculated based on the UE-configured maximum transmit power ($P_{CMAX,c}$) for each carrier, which in turn is calculated based on various parameters including maximum power reduction (MPR) depending on UE capacity and configuration. In step 832, eNB 802 receives the PH information and transmits power control command to UE 801 for each CC accordingly. In step 833, UE 802 adjusts its TX power for transmissions on each CC based on the received power control command.

The reported PH information is also used by eNB 802 for UL transmission scheduling. In step 840, eNB 802 makes scheduling decision taking into account the received PH information. In step 841, eNB 802 transmits UL grant for UL transmission over multiple CCs. In step 842, UE 801 performs UL transmission accordingly. Typically, the UL scheduling is determined by the network based on considerations including system throughput, load balancing, and channel condition. From UE perspective, however, sometimes channel condition and power consumption are more important. When UE adapts its maximum transmit power parameters based on its UL channel condition, such mechanism can facilitate the network to make UL scheduling decision accordingly to improve spectral efficiency and to reduce UE side power consumption.

In extended power headroom reporting, the inclusion of configured maximum transmit power is optional for individual CCs and thus is not always explicitly available at eNB side. However, eNB can always perform an estimation of UE-configured maximum transmit power and thus, the disclosed methods can still apply.

Figure 9:
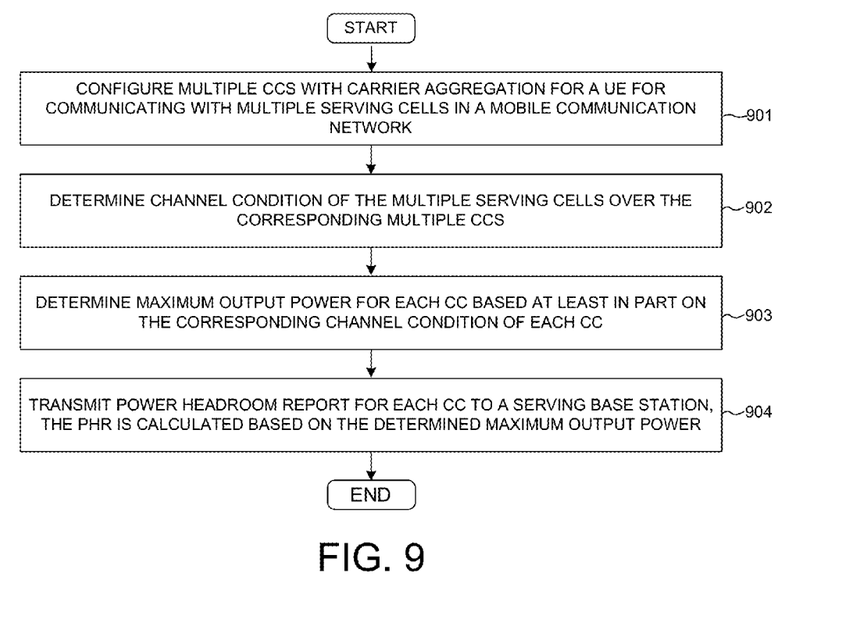
FIG. 9 is a flow chart of a method of maximum output power control with UE preference based on channel condition in accordance with one novel aspect.

FIG. 9 is a flow chart of a method of maximum output power configuration with UE preference based on channel condition in accordance with one novel aspect. In step 901, a user equipment (UE) configures multiple component carriers (CCs) with carrier aggregation for communicating with a serving base station (eNB) in a mobile communication network. In step 902, the UE determines channel condition (e.g., by estimating channel quality indicator) for multiple serving cells over the corresponding multiple CCs. In step 903, the UE determines maximum output power for each CC based at least in part on the corresponding channel condition of each CC. In step 904, the UE transmits power headroom report for each CC to the serving base station. The PHR is calculated based on the determined maximum output power. Because the PHR is channel condition dependent, the information can be used by the network for improved transmission efficiency.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
    configuring multiple component carriers (CCs) with carrier aggregation for a user equipment (UE) to communicate with multiple serving cells in a mobile communication network;
    determining channel condition of the multiple serving cells over the corresponding multiple CCs;
    determining maximum output power for each CC based at least in part on the corresponding channel condition of each CC, wherein the maximum output power for each CC is determined to approach a higher limit for a first serving cell having a better channel condition, and wherein the maximum output power is determined to approach a lower limit for a second serving cell having a poorer channel condition; and
    transmitting power headroom report (PHR) for each CC to a serving base station, wherein the PHR is calculated based on the determined maximum output power.

2. The method of claim 1, wherein the channel condition is determined by estimating a channel quality indicator (CQI) of each serving cell.

3. The method of claim 1, wherein the channel condition is determined by estimating a channel power gain, a signal-to-interference plus noise ratio, or a spectral efficiency.

4. The method of claim 1, wherein a maximum output power plus an inverse of a channel power gain for each CC is approximately equal to each other when each CC has the same channel bandwidth.

5. The method of claim 1, wherein each CC is first divided into sub-channels having the same sub-channel bandwidth, and wherein a maximum output power plus an inverse of a channel power gain for each sub-channel is approximately equal to each other.

6. The method of claim 1, wherein each maximum output power is ranged within the lower limit and the higher limit, wherein the UE determines the higher limit as the configured maximum transmit power for the first serving cell having the better channel condition, and wherein the UE determines the lower limit as the configured maximum transmit power for the second serving cell having the poorer channel condition.

7. The method of claim 1, wherein each maximum output power for each CC is determined to be approximately proportional to an average spectral efficiency of each corresponding CC.

8. The method of claim 1, wherein each maximum output power is determined based at least in part on a Maximum Power Reduction (MPR) value determined based at least in part on a corresponding channel condition.

9. The method of claim 8, wherein the MPR value is configured at a minimum of a first range for the first serving cell having the better channel condition, and wherein the MPR value is configured at a maximum of a second range for the second serving cell having the poorer channel condition.

10. The method of claim 8, wherein the MPR value is determined to approach the lower limit for the first serving cell having the better channel condition, and wherein the MPR value is determined to approach a higher limit for the same serving cell when that first serving cell has a poorer channel condition.

11. A user equipment (UE) comprising:
    a configuration module that configures multiple component carriers (CCs) with carrier aggregation for communicating with multiple serving cells in a mobile communication network;
    a measurement module that determines channel condition of the multiple serving cells over the corresponding multiple CCs;
    a power control module that determines maximum output power for each CC based at least in part on the corresponding channel condition of each CC, wherein the power control module determines that the maximum output power for each CC approaches a higher limit for a first serving cell having a better channel condition, and wherein the power control module determines that the maximum output power approaches a lower limit for a second serving cell having a poorer channel condition; and
    a transmitter that transmits power headroom report (PHR) for each CC to a serving base station, wherein the PHR is calculated based on the determined maximum output power.

12. The UE of claim 11, wherein the channel condition is determined by estimating a channel quality indicator of each serving cell.

13. The UE of claim 11, wherein the channel condition is determined by estimating a channel power gain, a signal-to-interference plus noise ratio, or a spectral efficiency.

14. The UE of claim 11, wherein a maximum output power plus an inverse of a channel power gain for each CC is approximately equal to each other when each CC has the same channel bandwidth.

15. The UE of claim 11, wherein each CC is first divided into sub-channels having the same sub-channel bandwidth, and wherein a maximum output power plus an inverse of a channel power gain for each sub-channel is approximately equal to each other.

16. The UE of claim 11, wherein each maximum output power is ranged within the lower limit and the higher limit, wherein the UE determines the higher limit as the configured maximum transmit power for the first serving cell having the better channel condition, and wherein the UE determines the lower limit as the configured maximum transmit power for the second serving cell having the poorer channel condition.

17. The UE of claim 11, wherein each maximum output power for each CC is determined to be approximately proportional to an average spectral efficiency of each corresponding CC.

18. The UE of claim 11, wherein each maximum output power is determined based at least in part on a Maximum Power Reduction (MPR) value determined based at least in part on a corresponding channel condition.

19. The UE of claim 18, wherein the MPR value is configured at a minimum of a first range for the first serving cell having a better channel condition, and wherein the MPR value is configured at a maximum of a second range for the second serving cell having the poorer channel condition.

20. The UE of claim 18, wherein the MPR value is determined to approach the lower limit for the first serving cell having the better channel condition, and wherein the MPR value is determined to approach the higher limit for the same serving cell when that first serving cell has a poorer channel condition.

* * * * *